United States Patent
Blackburn (10) Patent No.: US 7,367,584 B2
(45) Date of Patent: May 6, 2008

(54) GAS GENERATING SYSTEM

(75) Inventor: Jeffery S. Blackburn, Lake Orion, MI (US)

(73) Assignee: Automotive Systems Laboratory, Inc., Armada, MI (US)

(*) Notice: Subject to any disclaimer, the term of this patent is extended or adjusted under 35 U.S.C. 154(b) by 105 days.

(21) Appl. No.: 11/108,559

(22) Filed: Apr. 18, 2005

(65) Prior Publication Data

US 2005/0230949 A1 Oct. 20, 2005

Related U.S. Application Data

(60) Provisional application No. 60/563,525, filed on Apr. 19, 2004, provisional application No. 60/575,687, filed on May 29, 2004.

(51) Int. Cl.
*B60R 21/26* (2006.01)

(52) U.S. Cl. .................. 280/736; 280/741; 102/530; 102/531

(58) Field of Classification Search ............... 280/736, 280/741; 102/530, 531
See application file for complete search history.

(56) References Cited

U.S. PATENT DOCUMENTS 2,891,525 A 6/1959 Moore ............... 123/90.51

(Continued)

FOREIGN PATENT DOCUMENTS

DE 40 19 877 A1 6/1990

(Continued)

OTHER PUBLICATIONS

WO 98/39183; Title: Multi-Chamber Inflator; International Publication Date: Sep. 11, 1998; Inventors: Shahid A. Siddiqui and Rickey Lee Stratton; Applicant: Automotive Systems Laboratory, Inc.

(Continued)

*Primary Examiner*—Eric Culbreth
(74) *Attorney, Agent, or Firm*—L.C. Begin & Associates, PLLC.

(57) ABSTRACT

A gas generator (10) includes an igniter (27) and first and second inflation gas generant compositions (52, 52') positioned to enable fluid communication with the igniter (27) upon activation of the igniter. Flow regulators (54, 54') are provided to regulate a flow of combustion products from the igniter (27) to the first and second inflation gas generant compositions (52, 52'), to correspondingly regulate a time period between activation of the igniter (27) and initiation of combustion of the first and second inflation gas generant compositions (52, 52'). In another aspect, the gas generator (10) includes a modular baffle system (70) including a first baffle chamber (71) in fluid communication with an inflation gas generant combustion chamber (50) for receiving therein combustion products from combustion of an inflation gas generant (52) positioned in the combustion chamber. An outer baffle chamber (74) is also positioned radially outwardly from the first baffle chamber (71) for receiving therein combustion products from the first baffle chamber. In yet another aspect, the gas generator includes a first enclosure (12), a second enclosure (24), and a projection (44) formed on one of the first enclosure and the second enclosure. An aperture (46) is formed in the other one of the first enclosure (12) and the second enclosure (24) for receiving the projection (44) therein. At least a portion of the projection (44) is fixed within the aperture (46) to prevent withdrawal of the projection (44) from the aperture (46), thereby securing together the first enclosure (12) and the second enclosure (24).

12 Claims, 5 Drawing Sheets

U.S. PATENT DOCUMENTS

| | | | | |
|---|---|---|---|---|
| 3,794,347 A | 2/1974 | Zens | | 280/150 |
| 3,877,882 A | 4/1975 | Lette et al. | | |
| 3,880,447 A | 4/1975 | Thorn et al. | | |
| 3,958,949 A | 5/1976 | Plantif et al. | | |
| 3,985,076 A | 10/1976 | Schneiter et al. | | |
| 4,001,750 A | 1/1977 | Scherer et al. | | 337/280 |
| 4,012,189 A | 3/1977 | Vogt et al. | | 431/353 |
| 4,215,631 A | 8/1980 | Rucker | | 102/27 |
| 4,530,516 A | 7/1985 | Adams et al. | | 280/741 |
| 4,590,041 A * | 5/1986 | Hill | | 422/165 |
| 4,611,374 A | 9/1986 | Schnelle et al. | | 29/890.13 |
| 4,722,551 A | 2/1988 | Adams | | |
| 4,730,558 A | 3/1988 | Florin et al. | | 102/218 |
| 4,762,067 A | 8/1988 | Barker et al. | | 102/313 |
| 4,886,293 A | 12/1989 | Weiler et al. | | |
| 4,950,458 A | 8/1990 | Cunningham | | 422/164 |
| 5,028,070 A | 7/1991 | Bender | | |
| 5,048,862 A | 9/1991 | Bender et al. | | |
| 5,100,171 A | 3/1992 | Faigle et al. | | 280/736 |
| 5,215,721 A | 6/1993 | Tasaki et al. | | |
| 5,294,244 A | 3/1994 | Allerton, III et al. | | 75/401 |
| 5,318,323 A | 6/1994 | Pietz | | |
| 5,333,656 A | 8/1994 | Mackal | | 141/330 |
| 5,340,150 A | 8/1994 | Harada et al. | | |
| 5,372,449 A | 12/1994 | Bauer et al. | | 403/273 |
| 5,387,009 A | 2/1995 | Lauritzen et al. | | |
| 5,406,889 A | 4/1995 | Letendre et al. | | |
| 5,443,286 A | 8/1995 | Cunningham et al. | | |
| 5,466,420 A | 11/1995 | Parker et al. | | |
| 5,509,686 A | 4/1996 | Shepherd et al. | | 280/738 |
| 5,516,147 A | 5/1996 | Clark et al. | | 280/737 |
| 5,533,751 A | 7/1996 | Kort et al. | | 280/737 |
| 5,556,439 A | 9/1996 | Rink et al. | | 55/487 |
| 5,562,304 A | 10/1996 | Gest | | |
| 5,564,743 A | 10/1996 | Marchant | | 280/741 |
| 5,582,427 A | 12/1996 | Rink et al. | | 280/740 |
| 5,588,676 A | 12/1996 | Clark et al. | | 280/741 |
| 5,609,360 A | 3/1997 | Faigle et al. | | 280/740 |
| 5,611,566 A | 3/1997 | Simon et al. | | 280/736 |
| 5,613,703 A | 3/1997 | Fischer | | 280/741 |
| 5,622,380 A | 4/1997 | Khandhadia et al. | | 280/736 |
| 5,624,133 A | 4/1997 | Wong | | |
| 5,624,134 A | 4/1997 | Iwai et al. | | |
| 5,628,528 A | 5/1997 | DeSautelle et al. | | 280/736 |
| 5,630,619 A | 5/1997 | Buchanan et al. | | 280/741 |
| 5,662,722 A | 9/1997 | Shiban | | 55/413 |
| 5,702,494 A | 12/1997 | Tompkins et al. | | 55/498 |
| 5,725,245 A | 3/1998 | O'Driscoll et al. | | |
| 5,799,973 A | 9/1998 | Bauer et al. | | 280/741 |
| 5,813,695 A * | 9/1998 | O'Driscoll et al. | | 280/741 |
| 5,829,785 A | 11/1998 | Jordan et al. | | 280/741 |
| 5,845,935 A | 12/1998 | Enders et al. | | 280/743.2 |
| 5,860,672 A | 1/1999 | Petersen | | 280/728.2 |
| 5,872,329 A | 2/1999 | Burns et al. | | 149/36 |
| 5,934,705 A | 8/1999 | Siddiqui et al. | | 280/736 |
| 5,941,562 A | 8/1999 | Rink et al. | | 280/741 |
| 5,970,880 A | 10/1999 | Perotto | | 102/531 |
| 6,019,389 A | 2/2000 | Burgi et al. | | 280/736 |
| 6,032,979 A | 3/2000 | Mossi et al. | | 280/741 |
| 6,074,502 A | 6/2000 | Burns et al. | | |
| 6,095,556 A | 8/2000 | Bailey et al. | | 280/737 |
| 6,095,559 A | 8/2000 | Smith et al. | | |
| 6,095,561 A | 8/2000 | Siddiqui et al. | | 280/472 |
| 6,106,000 A | 8/2000 | Stewart | | 280/728.2 |
| 6,116,491 A | 9/2000 | Kutoh | | 228/42 |
| 6,149,193 A | 11/2000 | Canterberry et al. | | 280/741 |
| 6,210,505 B1 | 4/2001 | Khandhadia et al. | | 149/36 |
| 6,244,623 B1 | 6/2001 | Moore et al. | | 280/741 |
| 6,379,627 B1 | 4/2002 | Nguyen et al. | | |
| 6,464,254 B2 | 10/2002 | Chikaraishi et al. | | 280/741 |
| 6,474,684 B1 | 11/2002 | Ludwig et al. | | |
| 6,485,051 B1 | 11/2002 | Taguchi et al. | | |
| 6,581,963 B2 | 6/2003 | Mangun | | 280/741 |
| 6,709,012 B1 | 3/2004 | Tanaka et al. | | |
| 6,764,096 B2 | 7/2004 | Quioc | | |
| 6,776,434 B2 | 8/2004 | Ford et al. | | 280/729 |
| 6,846,014 B2 | 1/2005 | Rink et al. | | 280/740 |
| 6,851,705 B2 * | 2/2005 | Young et al. | | 280/729 |
| 6,871,873 B2 | 3/2005 | Quioc et al. | | 280/741 |
| 6,908,104 B2 | 6/2005 | Canterbery et al. | | 280/736 |
| 6,929,284 B1 | 8/2005 | Saso et al. | | |
| 6,935,655 B2 | 8/2005 | Longhurst et al. | | 280/736 |
| 6,945,561 B2 | 9/2005 | Nakashima et al. | | |
| 6,948,737 B2 | 9/2005 | Ohji et al. | | |
| 6,976,702 B2 | 12/2005 | Yokota et al. | | 280/730.2 |
| 7,073,820 B2 | 7/2006 | McCormick | | 280/741 |
| 7,178,830 B2 | 2/2007 | Blackburn | | 280/736 |
| 7,237,801 B2 | 7/2007 | Quioc et al. | | 280/736 |
| 7,267,365 B2 | 9/2007 | Quioc | | 280/736 |
| 2002/0053789 A1 * | 5/2002 | Fujimoto et al. | | 280/741 |
| 2003/0127840 A1 | 7/2003 | Nakashima et al. | | |
| 2003/0155757 A1 | 8/2003 | Larsen et al. | | |
| 2003/0201628 A1 | 10/2003 | Choudhury et al. | | 280/729 |
| 2004/0046373 A1 * | 3/2004 | Wang et al. | | 280/741 |
| 2005/0001414 A1 * | 1/2005 | Matsuda et al. | | 280/736 |
| 2005/0134031 A1 | 6/2005 | McCormick | | |
| 2005/0161925 A1 | 7/2005 | Blackburn | | 280/741 |
| 2005/0194772 A1 | 9/2005 | Numoto et al. | | 280/741 |
| 2005/0230949 A1 | 10/2005 | Blackburn | | |
| 2005/0263993 A1 | 12/2005 | Blackburn | | |
| 2005/0263994 A1 | 12/2005 | Quioc | | |
| 2005/0280252 A1 | 12/2005 | McCormick | | |
| 2006/0005734 A1 | 1/2006 | McCormick | | |
| 2006/0043716 A1 | 3/2006 | Quioc | | |
| 2006/0082112 A1 | 4/2006 | Blackburn | | 280/736 |

FOREIGN PATENT DOCUMENTS

| | | |
|---|---|---|
| DE | 42 27 547 A1 | 2/1994 |
| EP | 0602785 B1 | 10/1993 |
| EP | 0728633 A1 | 2/1996 |
| EP | 0844149 A1 | 11/1997 |
| EP | 0 864 470 A1 | 9/1998 |
| EP | 1122134 B1 | 7/2000 |
| EP | 1308353 A2 | 9/2002 |
| JP | 04055151 A | 2/1992 |
| JP | 05096147 | 4/1993 |
| JP | 05178155 A | 7/1993 |
| JP | 05178156 A | 7/1993 |
| JP | 06227358 A | 8/1994 |
| WO | WO 98/39183 | 9/1998 |
| WO | WO 2004/091982 A1 | 10/2004 |
| WO | WO 2005/058645 A2 | 6/2005 |
| WO | WO 2005/086917 | 9/2005 |
| WO | WO 2006/044516 A2 | 4/2006 |
| WO | WO 2006/078819 A2 | 7/2006 |

OTHER PUBLICATIONS

U.S. Appl. No. 11/251,225.
U.S. Appl. No. 11/358,786.

* cited by examiner

GAS GENERATING SYSTEM

CROSS-REFERENCE TO RELATED APPLICATIONS

This application claims the benefit of U.S. Provisional Application Ser. No. 60/563,525, filed on Apr. 19, 2004 and U.S. Provisional Application Ser. No. 60/575,687, Filed May 29, 2004.

TECHNICAL FIELD

The present invention relates generally to gas generators and, more particularly, to filterless gas generators for use in applications such as inflatable occupant restraint systems in motor vehicles.

BACKGROUND OF THE INVENTION

Installation of inflatable occupant restraint systems, generally known as "airbags," as standard equipment in all new vehicles has intensified the search for smaller, lighter and less expensive restraint systems. Accordingly, since the inflator used in such systems tends to be the heaviest and most expensive component, there is a need for a lighter and less expensive inflator.

A typical inflator includes a cylindrical steel or aluminum housing having a diameter and length related to the vehicle application whereby the propellant is contained therein. The inflator is generally provided with an internal filter comprising one or more layers of steel screen of varying mesh and wire diameter. Gas produced upon combustion of the propellant passes through the filter before exiting the inflator. Particulate material, or slag, produced during combustion of the propellant in a conventional system is substantially removed as the gas passes through the filter.

Much research and development in gas generant technology has been devoted to reducing the smoke, soot and other particulates produced during combustion. Inhalation of the particulates by a vehicle occupant after airbag activation can be hazardous. Various gas generant formulations and inflator design have been developed in which the particulates resulting from combustion of the gas generant are substantially eliminated or significantly reduced.

Nevertheless, certain types of propellants are still desirable notwithstanding the relatively high percent of combustion solids produced, given favorable characteristics such as burn rate, sustained combustion, and repeatability of performance.

Other ongoing concerns with gas generators include the need to control the time period between activation of the igniter and initiation of gas generant combustion (especially in gas generators having multiple combustion chambers configured for supplying inflation gas to multiple inflatable elements of an associated system), and the need to increase manufacturing efficiency and reduce manufacturing costs.

SUMMARY OF THE INVENTION

The present invention provides a gas generating system including an igniter, and first and second inflation gas generant compositions positioned to enable fluid communication with the igniter upon activation of the igniter. Flow regulators are provided to regulate a flow of combustion products from the igniter to the first and second inflation gas generant compositions, to correspondingly regulate a time period between activation of the igniter and initiation of combustion of the first and second inflation gas generant compositions. In another aspect, the gas generating system includes a modular baffle system including a first baffle chamber in fluid communication with an inflation gas generant combustion chamber for receiving therein combustion products from combustion of an inflation gas generant positioned in the combustion chamber. An outer baffle chamber is also positioned radially outwardly from the first baffle chamber for receiving therein combustion products from the first baffle chamber. In yet another aspect, the gas generating system includes a first enclosure, a second enclosure, and a projection formed on one of the first enclosure and the second enclosure. An aperture is formed in the other one of the first enclosure and the second enclosure for receiving the projection therein. At least a portion of the projection is fixed within the aperture to prevent withdrawal of the projection from the aperture, thereby securing together the first enclosure and the second enclosure.

BRIEF DESCRIPTION OF THE DRAWINGS

FIG. 3 is a cross-sectional sideview of a shell in accordance with the present invention;

DETAILED DESCRIPTION

FIGS. 1-8 show various embodiments of a gas generating system including a gas generator 10 in accordance with the present invention. In the embodiments shown in FIGS. 1-8, gas generator 10 is designed for incorporation into a vehicle occupant protection system 200 (FIG. 8) to generate inflation gas for inflating inflatable elements of the protection system.

Figure 1:
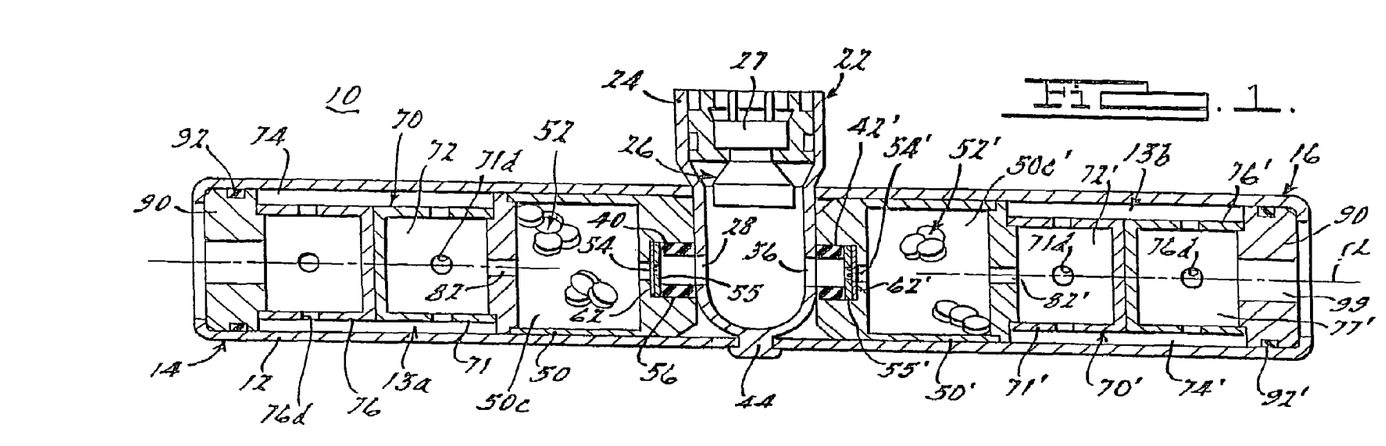
FIG. 1 is a cross-sectional side view of a first embodiment of a gas generating system in accordance with the present invention.
Figure 2:
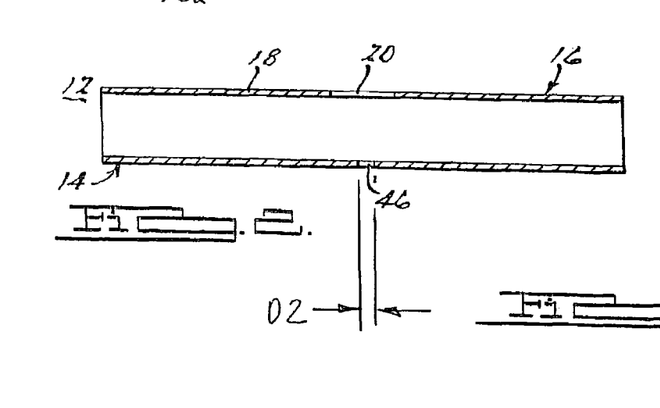
FIG. 2 is a cross-sectional side view of a gas generator housing in accordance with the present invention.
Figure 4:
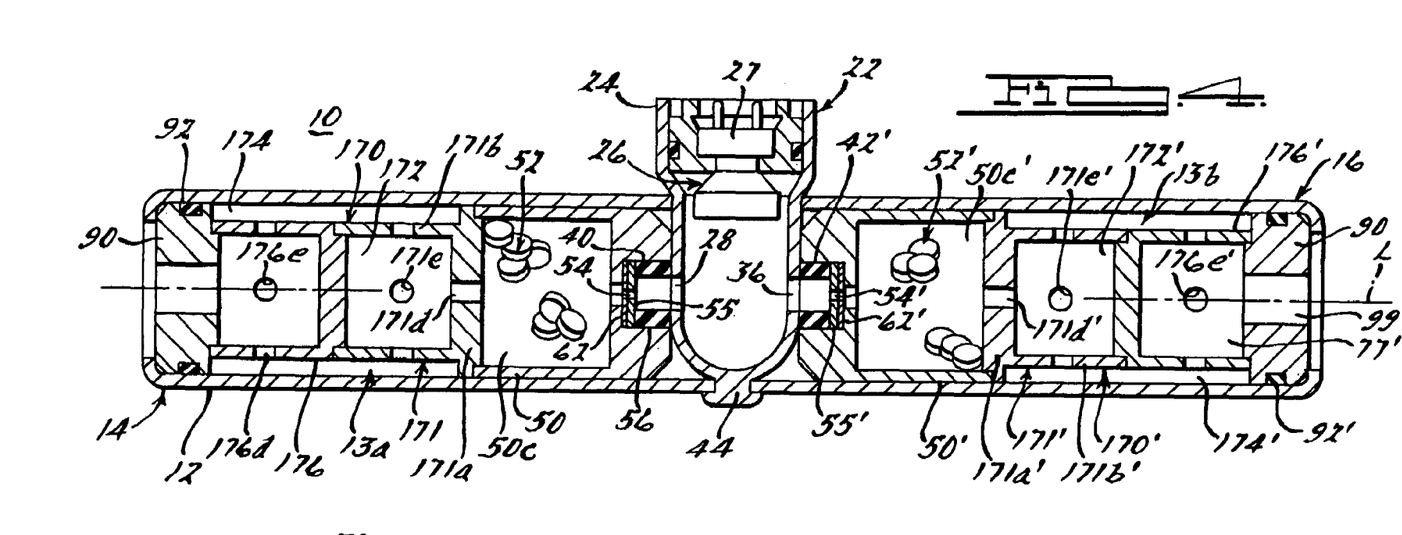
FIG. 4 is a cross-sectional side view of a second embodiment of a gas generating system in accordance with the present invention.

As seen in FIGS. 1, 2, and 4, gas generator 10 of the present invention includes a substantially cylindrical housing 12 having a first end 14, a second end 16 opposite first end 14, and a wall 18 defining an enclosure for flow of an inflation fluid therethrough upon activation of the gas generating system. A longitudinal axis L extends longitudinally and centrally through housing 12. An opening 20 is formed in wall 18 intermediate first end 14 and second end 16 (and preferably centrally along the length of housing 12) for receiving therein a portion of an igniter assembly 22 (described in greater detail below) used for igniting an inflation gas generant composition 52 positioned in a combustion chamber of the gas generating system. Also, an aperture 46 is formed in wall 18 of housing 12 for receiving therein a complementary projection 44 extending from a surface of an igniter assembly shell 24 (as described in greater detail below.) Housing 12 may be cast, roll-formed or otherwise fabricated from steel or other suitable metals or metal alloys. Alternatively, housing 12 may be molded from a suitable polymer material.

Referring to FIGS. 1, 3A-3B, and 4, an igniter assembly 22 is provided for initiating combustion of one or more inflation gas generant compositions positioned within gas generator 10. Igniter assembly 22 preferably comprises a longitudinal shell 24 and a micro-gas generator 26 secured within shell 24.

A projection 44 is formed along an exterior surface of shell 24. Projection 44 is sized for insertion into complementary aperture 46 formed in housing 12. Shell 24 is preferably oriented substantially orthogonal to housing longitudinal axis L, being positioned in housing opening 20 and secured within housing 12 by inserting and securing projection 44 in housing aperture 46. At least a portion of projection 44 is fixed within aperture 46 to prevent withdrawal of the projection from the aperture, thereby securing together shell 24 and housing 12.

Figures 3A, 3B:
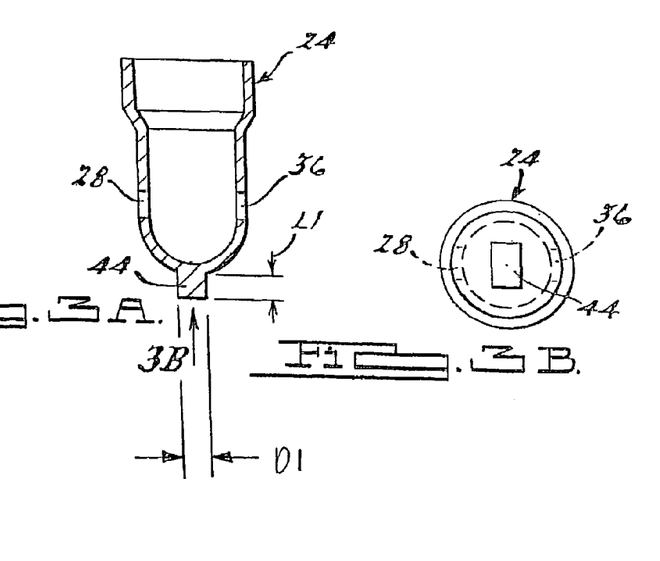
FIG. 3A is a top view of the shell shown in FIG. 3.
FIG. 3B is a bottom view of the igniter assembly shell appearing in FIG. 3A showing a schematic representation of a projection formed along the shell for insertion into an aperture in the gas generator housing, in accordance with of one embodiment of the present invention.

In one embodiment, as shown in FIGS. 1, 3, and 4, a length dimension L1 of projection 44 is preferably sized so as to be greater than the thickness of housing wall 18 such that a portion of projection 44 inserted into the aperture along an inner side of wall 18 extends beyond an outer surface of the wall. The portion of projection 44 extending beyond the opposite side of wall 18 is deformable to prevent withdrawal of projection 44 from aperture 46. Upon placement within aperture 46, projection 44 can be flattened or otherwise flanged against the outer portion of housing wall 18, thereby fixing shell 24 in place within housing 12 instead of welding the parts together. In essence, a fastener similar to a rivet is formed during formation of shell 24 to facilitate ease of assembly and proper positioning of shell 24 relative to housing 12. Referring to FIGS. 2 and 3A, in an alternative embodiment, a dimension D1 of projection 44 is sized so as to be slightly larger than a complementary dimension D2 of aperture 46 such that an interference fit is formed when the projection is inserted into the aperture.

In accordance with the present invention, shell 24 (FIGS. 3A and 3B) is formed to include a first shell orifice 28 and a second shell orifice 36 positioned along the length of the shell for enabling fluid communication with respective inflation gas generant combustion chambers, as discussed below. As shown in (FIGS. 3A and 3B), first shell orifice 28 is preferably positioned one hundred and eighty degrees opposite second shell orifice 36. In addition, shell orifices 28 and 36 are both preferably positioned an equivalent radial distance from the side of an inner wall of housing 12. Shell 24 may be stamped, drawn, cast and finish machined, or otherwise formed from steel or another suitable metal or metal alloy.

Referring to FIGS. 1 and 4, a micro-gas generator 26 as known in the art is coupled to shell 24 so as to be in fluid communication with an interior of the shell. In the embodiment shown in FIGS. 1 and 4, micro-gas generator 26 is secured within shell 24. Micro-gas generator 26 is preferably crimped or otherwise suitably secured within shell 24 so that, upon activation of micro-gas generator 26, the gas generator is in fluid communication with the interior of shell 24.

Micro-gas generator 26 preferably contains a known igniter 27 (for example, a bridgewire igniter) therein in ignitable communication with a gas generant (not shown) also contained within micro-gas generator 26. In the embodiments shown in FIGS. 1 and 4, igniter 27 is positioned within an annular bore of shell 24. Igniter 27 may be formed as known in the art. One example of a suitable igniter is described in U.S. Pat. No. 6,009,809, incorporated herein by reference.

Positioning and securement of igniter assembly 22 within housing 12 as shown in FIGS. 1 and 4 effectively partitions the interior of the housing into a first gas generator chamber 13a extending generally between igniter assembly 22 and housing first end 14, and a second gas generator chamber 13b extending generally between igniter assembly 22 and housing second end 16. Gas generator chambers 13a and 13b may be of equal or different volume. In a preferred embodiment, gas generator chambers 13a and 13b are equipped with the same components (described in greater detail below), thereby essentially forming separate gas generator chambers that constitute mirror images of each other.

Referring again to FIGS. 1 and 4, first shell orifice 28 is aligned with a corresponding silicone gas seal 40 made from silicone tubing, provided by known manufacturers thereof. Similarly, second shell orifice 36 is aligned with a corresponding silicone gas seal 42 made from silicone tubing. Gas seals 40 and 42 may be secured in their respective positions by any method which provides a gas-tight seal at a junction between shell 24 and the gas seals. For example, an interference fit may be formed between each of gas seals 40 and 42 inserted into a respective one of shell orifices 28 and 36. In accordance with the present invention, first seal 40 and second seal 42 have fluid flow channels provided therein which may have equal or different cross-sectional dimensions.

Referring to FIGS. 1, 4, 5, and 5A, an enclosure 50 is provided for housing an inflation gas generant composition 52 that is ignitable upon fluid communication with igniter combustion products. Enclosure 50 preferably includes a substantially circular base portion 50a and a substantially cylindrical wall 50b extending from base portion 50a. Base portion 50a and wall 50b combine to define a combustion chamber 50c housing inflation gas generant composition 52. As seen in FIGS. 1 and 4, enclosure 50 may be slidingly inserted into housing 12 and positioned to abut shell 24. Enclosure 50 may be stamped, drawn, cast and finish machined or otherwise formed from steel or another suitable metal or metal alloy.

Gas generant composition 52 positioned in enclosure 50 may be any known gas generant composition useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. Nos. 10/407,300 and 60/369,775, incorporated by reference herein.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Alkali metal nitrates, chlorates and perchlorates are other useful oxidizers when combined with a high-temperature slag former.

Materials which function as high-temperature slag formers have melting points at, or higher, than the combustion temperature or decompose into compounds which have melting points, at or higher, than the combustion temperature. The alkaline earth oxides, hydroxides and oxalates are useful high-temperature slag formers. Magnesium carbonate and magnesium hydroxide are very useful high-temperature slag formers because they decompose before melting to form magnesium oxide which has a very high melting point (2800° C.). As mentioned above, oxidizers such as strontium nitrate are especially beneficial since they serve both as high-temperature slag former and oxidizer, thereby increasing the amount of gas produced per unit weight.

Metal salts as fuels, such as the calcium or strontium salt of 5-aminotetrazole, tetrazole, or ditetrazole are also useful high-temperature slag formers, although not as efficient as the oxidizers. Other metal oxides having high melting points such as the oxides of titanium, zirconium and cerium are also useful high-temperature slag formers.

Materials which function as low-temperature slag formers have melting points at or below the combustion temperature or form compounds during combustion which have melting points at or below the combustion temperature. Compounds such as silicon dioxide ($SiO_2$), boric oxide ($B_2O_3$), vanadium pentoxide ($V_2O_5$), sodium silicate ($Na_2SiO_3$), potassium silicate ($K_2SiO_3$), sodium carbonate ($Na_2CO_3$) and potassium carbonate ($K_2CO_3$) are examples of low-temperature slag formers.

It should be noted that either the oxidizer or the fuel can act as a low-temperature slag former if it contains a suitable substance which can be converted during combustion. For example, sodium nitrate or the sodium salt of tetrazole, during the combustion reactions, can convert to sodium carbonate or sodium silicate, if silicon dioxide is also present.

It is desirable to combine the fuel or oxidizer (or both) and the high temperature slag former into one ingredient where the strontium nitrate serves as both the oxidizer and high-temperature slag former. In this case, the strontium nitrate will yield, upon combustion, strontium oxide (SrO), which has a high melting point (2430° C.) as well as oxygen and nitrogen gases. Silicon dioxide, used as a low-temperature slag former is available in many forms ranging from very fine submicron particles to coarse ground sand with melting points from about 1500° to 1700° C. The combination of strontium oxide and silicon dioxide forms strontium silicate ($SrSiO_3$) with a melting point of approximately 1580° C.

$SrO + SiO_2 \square SrSiO_3$

Strontium oxide can also react with carbon dioxide, forming strontium carbonate which melts at approximately 1500° C. at high pressure.

$SrO + CO_2 \square SrCO_3$

The extent of each of these reactions depends upon various conditions such as combustion temperature, pressure, particle size of each component, and the contact time between the various materials.

It is believed that the function of the low-temperature slag former is to melt and glue the high-temperature solid particles together. With only low-temperature residue, the material is liquid and is difficult to filter. With only high-temperature materials, finely divided particles are formed which are also difficult to filter. The objective is to produce just enough low-temperature material to induce a coherent mass or slag to form, but not enough to make a low viscosity liquid.

Set in the above context, the pyrotechnic, slag forming gas generating mixture disclosed in U.S. Pat. No. 5,037,757 comprises at least one each of the following materials.

a. A fuel selected from the group of tetrazole compounds consisting of aminotetrazole, tetrazole, bitetrazole and metal salts of these compounds as well as triazole compounds and metal salts of triazole compounds.

b. An oxygen containing oxidizer compound selected from the group consisting of alkali metal, alkaline earth metal, lanthanide and ammonium nitrates and perchlorates or from the group consisting of alkali metal or alkaline earth metal chlorates or peroxides.

c. A high temperature slag forming material selected from the group consisting of alkaline earth metal or transition metal oxides, hydroxides, carbonates, oxalates, peroxides, nitrates, chlorates and perchlorates or from the group consisting of alkaline earth metal salts of tetrazoles, bitetrazoles and triazoles.

d. A low-temperature slag forming material selected from the group consisting of silicon dioxide, boric oxide and vanadium pentoxide or from the group consisting of alkali metal silicates, borates, carbonates, nitrates, perchlorates or chlorates or from the group consisting of alkali metal salts of tetrazoles, bitetrazoles and triazoles or from the group consisting of the various naturally occurring clays and talcs.

In practice, certain of the materials may be substituted or interchanged. Specifically, both the fuel and the high-temperature slag forming material may be selected from the group consisting of alkaline earth metal salts of tetrazoles, bitetrazoles and triazoles. Both the oxygen containing oxidizer compound and high-temperature slag forming material may be comprised of one or more of the group consisting of alkaline earth metal and lanthanide nitrates, perchlorates, chlorates and peroxides. Both the fuel and the low-temperature slag forming material may comprise one or more of the group consisting of alkali metal salts of tetrazoles, bitetrazoles and triazoles. Both the oxygen containing oxidizer compound and the low-temperature slag forming material may comprise one or more of the group consisting of alkali metal nitrates, perchlorates, chlorates and peroxides.

The fuel may comprise 5-aminotetrazole which is present in a concentration of about 22 to about 36% by weight, where the oxygen containing oxidizer compound and high-temperature slag former is strontium nitrate which is present in a concentration of about 38 to about 62% by weight and said low-temperature slag.

Alternatively, the fuel and high-temperature slag forming material may comprise the strontium salt of 5-aminotetrazole which is present in a concentration of about 30 to about 50% by weight, where the oxygen containing oxidizer compound is potassium nitrate which is present in a concentration of about 40 to about 60% by weight, and the low-temperature slag former is talc which is present in a concentration of about 2 to about 10% by weight. The talc may be replaced by clay.

Another combination comprises the 5-aminotetrazole which is present in a combination of about 22 to about 36% by weight, where the oxygen containing oxidizer compound is sodium nitrate which is present in a concentration of about 30 to about 50% by weight, the high-temperature slag forming material is magnesium carbonate which is present in a concentration of about 8 to about 30% by weight, and the low-temperature slag former is silicon dioxide which is present in a concentration of about 2 to about 20% by weight. Magnesium carbonate may be replaced by magnesium hydroxide.

Yet another combination comprises the potassium salt of 5-aminotetrazole which is present in a concentration of about 2 to about 30% by weight which serves in part as a fuel and in part as a low-temperature slag former and wherein 5-aminotetraozle in a concentration of about 8 to about 40% by weight also serves as a fuel, and wherein clay in a concentration of about 2 to about 10% by weight serves in part as the low-temperature slag former and wherein strontium nitrate in a concentration of about 40 to about 66% by weight serves as both the oxygen containing oxidizer and high-temperature slag former.

U.S. Pat. No. 5,872,329 discloses nonazide gas generants for a vehicle passenger restraint system employing ammonium nitrate as an oxidizer and potassium nitrate as an ammonium nitrate phase stabilizer. The fuel, in combination with phase stabilized ammonium nitrate, is selected from the group consisting of amine salts of tetrazoles and triazoles having a cationic amine component and an anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic amine component is selected from an amine group including ammonia, hydrazine, guanidine compounds such as guanidine, aminoguanidine, diaminoguanidine, triaminoguanidine, dicyandiamide, nitroguanidine, nitrogen subsituted carbonyl compounds such as urea, carbohydrazide, oxamide, oxamic hydrazide, bis-(carbonamide) amine, azodicarbonamide, and hydrazodicarbonamide, and amino azoles such as 3-amino-1,2,4-triazole, 3-amino-5-nitro-1,2,4-triazole, 5-aminotetrazole and 5-nitraminotetrazole. Optional inert additives such as clay or silica may be used as a binder, slag former, coolant or processing aid. Optional ignition aids comprised of nonazide propellants may also be utilized in place of conventional ignition aids such as $BKNO_3$. The gas generants are prepared by dry blending and compaction of the comminuted ingredients.

Preferred high nitrogen nonazides employed as primary fuels in gas generant compositions include, in particular, amine salts of tetrazole and triazole selected from the group including monoguanidinium salt of 5,5',-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH.sub.3), diammonium salt of 5,5'-bis-1H-tetrazole (BHT.2NH$_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), diguanidinium salt of 5,5'-Azobis-1H-tetrazole (ABHT-2GAD), and monoammonium salt of 5-Nitramino-1H-tetrazole (NAT-1NH$_3$). The nonazide fuel generally comprises 15-65%, and preferably comprises 20-55%, by weight of the total gas generant composition.

The foregoing amine salts of tetrazole or triazole are dry-mixed with phase stabilized ammonium nitrate. The oxidizer is generally employed in a concentration of about 35 to 85% by weight of the total gas generant composition. The ammonium nitrate is stabilized by potassium nitrate, as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

If a slag former, binder, processing aid, or coolant is desired, inert components such as clay, diatomaceous earth, alumina, or silica are provided in a concentration of 0.1-10% of the gas generant composition, wherein toxic effluents generated upon combustion are minimized.

Optional ignition aids, used in conjunction with the present invention, are selected from nonazide gas generant compositions comprising a fuel selected from a group including triazole, tetrazolone, aminotetrazole, tetrazole, or bitetrazole, or others as described in U.S. Pat. No. 5,139,588 to Poole, the teachings of which are herein incorporated by reference. Conventional ignition aids such as $BKNO_3$ are not required because the tetrazole or triazole based fuel, when combined with phase stabilized ammonium nitrate, significantly improves ignitability of the propellant and also provides a sustained burn rate.

U.S. Pat. No. 6,074,502 discloses nonazide gas generant compositions including phase stabilized ammonium nitrate (PSAN), one or more primary nonazide high-nitrogen fuels, and one or more secondary nonazide high-nitrogen fuels selected from the group including azodicarbonamide (ADCA) and hydrazodicarbonamide (AH).

One or more primary nonazide high-nitrogen fuels are selected from a group including tetrazoles and bitetrazoles such as 5-nitrotetrazole and 5,5'-bitetrazole; triazoles and nitrotriazoles such as nitroaminotriazole and 3-nitro-1,2,4 triazole-5-one; nitrotetrazoles; and salts of tetrazoles and salts of triazoles.

More specifically, salts of tetrazoles include in particular, amine, amino, and amide nonmetal salts of tetrazole and triazole selected from the group including monoguanidinium salt of 5,5'-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH$_3$), diammonium salt of 5,5'-bis-1H-tetrazole (BHT.2NH$_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), and diguanidinium salt of 5,5'-Azobis-1H-tetrazole (ABHT.2GAD).

Amine salts of triazoles include monoammonium salt of 3-nitro-1,2,4-triazole (NTA.1NH$_3$), monoguanidinium salt of 3-nitro-1,2,4-triazole (NTA.1GAD), diammonium salt of dinitrobitriazole (DNBTR.2NH$_3$), diguanidinium salt of dinitrobitriazole (DNBTR.2GAD), and monoammonium salt of 3,5-dinitro-1,2,4-triazole (DNTR.1NH$_3$).

A preferred gas generant composition results from the mixture of one or more primary nonazide high-nitrogen fuels comprising 5%-45%, and more preferably 9%-27% by weight of the gas generant composition; one or more secondary nonazide high-nitrogen fuels comprising 1%-35%, and more preferably 1%-15% by weight of the gas generant composition; and PSAN comprising 55%-85%, and more preferably 66%-78% by weight of the gas generant composition. Tetrazoles are more preferred than triazoles due to a higher nitrogen and lower carbon content thereby resulting in a higher burning rate and lower carbon monoxide. Salts of tetrazoles are even more preferred because of superior ignition stability. As taught by Onishi, U.S. Pat. No. 5,439,251, herein incorporated by reference, salts of tetrazoles are much less sensitive to friction and impact thereby enhancing process safety. Nonmetallic salts of bitetrazoles are more preferred than nonmetallic salts of tetrazoles due to superior thermal stability. As also taught by Onishi, nonmetallic salts of bitetrazoles have higher melting points and higher exothermal peak temperatures thereby resulting in greater thermal stability when combined with PSAN. The diammonium salt of bitetrazole is most preferred because it is produced in large quantities and readily available at a reasonable cost.

An optional burn rate modifier, from 0-10% by weight in the gas generant composition, is selected from a group including an alkali metal, an alkaline earth or a transition metal salt of tetrazoles or triazoles; an alkali metal or alkaline earth nitrate or nitrite; TAGN; dicyandiamide, and alkali and alkaline earth metal salts of dicyandiamide; alkali and alkaline earth borohydrides; or mixtures thereof. An optional combination slag former and coolant, in a range of 0 to 10% by weight, is selected from a group including clay, silica, glass, and alumina, or mixtures thereof. When combining the optional additives described, or others known to those skilled in the art, care should be taken to tailor the additions with respect to acceptable thermal stability, burn rates, and ballistic properties.

U.S. Pat. No. 6,287,400 discloses gas generant compositions containing 5-aminotetrazole nitrate (5-ATN) provided at 25-100% by weight of the gas generant, depending on the application. 5-ATN is characterized as an oxygen-rich fuel attributed to the oxygen in the nitrate group. The use of 5-ATN within a gas generant composition therefore requires little or no additional oxidizer, again depending on the application. 5-ATN is more preferably provided at 30-95% by weight and most preferably provided at 55-85% by weight of the gas generant composition.

In certain applications, the oxygen balance must be tailored to accommodate reduced levels of carbon monoxide (CO) and nitrogen oxides (NOx) as driven by original equipment manufacturer toxicity requirements. For example, the gas generated upon combustion of a gas generant within a vehicle occupant restraint system must minimize or eliminate production of these toxic gases. Therefore, when adding an oxidizer to 5-ATN, it is generally understood that an oxygen balance of about −4.0 to +4.0 is desirable when the gas generant is used in an airbag inflator. The preferred percentages of 5-ATN reflect this characteristic.

One or more oxidizers may be selected from the group including nonmetal, alkali metal, and alkaline earth metal nitrates, nitrites, perchlorates, chlorates, and chlorites for example. Other oxidizers well known in the art may also be used. These include alkali, alkaline earth, and transitional metal oxides, for example. Preferred oxidizers include phase stabilized ammonium nitrate (PSAN), ammonium nitrate, potassium nitrate, and strontium nitrate. The oxidizer(s) is provided at 5-70% by weight of the gas generant composition and more preferably at 20-45% by weight of the oxidizer.

Standard additives such as binders, slag formers, burn rate modifiers, and coolants may also be incorporated if desired. Inert components may be included and are selected from the group containing clay, silicon, silicates, diatomaceous earth, and oxides such as glass, silica, alumina, and titania. The silicates include but are not limited to silicates having layered structures such as talc and the aluminum silicates of clay and mica; aluminosilicate; borosilicates; and other silicates such as sodium silicate and potassium silicate. The inert component is present at about 0.1-20% by weight, more preferably at about 0.1-8%, and most preferably at 0.1-3%. A most preferred embodiment contains 73.12% 5-ATN and 26.88% PSAN10 (stabilized with 10% potassium nitrate).

U.S. Pat. No. 5,872,329 discloses nonazide gas generants inclusing phase stabilized ammonium nitrate (PSAN), nitroguanidine (NQ), and one or more nonazide high-nitrogen fuels. One or more high-nitrogen fuels are selected from a group including tetrazoles such as 5-nitrotetrazole, 5,5'-bitetrazole, triazoles such as nitroaminotriazole, nitrotriazoles, nitrotetrazoles, salts of tetrazoles and triazoles, and 3-nitro-1,2,4 triazole-5-one.

More specifically, salts of tetrazoles include in particular, amine, amino, and amide salts of tetrazole and triazole selected from the group including monoguanidinium salt of 5,5'-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH$_3$), diammonium salt of 5,5'-bis-1H-tetrazole (BHT.2NH$_3$), mono-3-amino-1,2,4-triazolium salt of 5,5'-bis-1H-tetrazole (BHT.1ATAZ), di-3-amino-1,2,4-triazolium salt of 5,5∝-bis-1H-tetrazole (BHT.2ATAZ), and diguanidinium salt of 5,5'-Azobis-1H-tetrazole (ABHT.2GAD).

Amine salts of triazoles include monoammonium salt of 3-nitro-1,2,4-triazole (NTA.1NH$_3$), monoguanidinium salt of 3-nitro-1,2,4-triazole (NTA.1GAD), diammonium salt of dinitrobitriazole (DNBTR.2NH$_3$), diguanidinium salt of dinitrobitriazole (DNBTR.2GAD), and monoammonium salt of 3,5-dinitro-1,2,4-triazole (DNTR.1NH$_3$).

A preferred fuel(s) is selected from the group consisting of amine and other nonmetal salts of tetrazoles and triazoles having a nitrogen containing cationic component and a tetrazole and/or triazole anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic component is formed from a member of a group including amines, aminos, and amides including ammonia, hydrazine, guanidine compounds such as guanidine, aminoguanidine, diaminoguanidine, triaminoguanidine, dicyandiamide, nitroguanidine, nitrogen subsituted carbonyl compounds such as urea, carbohydrazide, oxamide, oxamic hydrazide, bis-(carbonamide) amine, azodicarbonamide, and hydrazodicarbonamide, and, amino azoles such as 3-amino-1,2, 4-triazole, 3-amino-5-nitro-1,2,4-triazole, 5-aminotetrazole and 5-nitraminotetrazole. Optional inert additives such as clay, alumina, or silica may be used as a binder, slag former, coolant or processing aid. Optional ignition aids comprised of nonazide propellants may also be utilized in place of conventional ignition aids such as BKNO$_3$.

Certain disclosed gas generant compositions contain a hydrated or anhydrous mixture of nitroguanidine, at least one nonazide high-nitrogen fuels selected from the group consisting of guanidines, tetrazoles, triazoles, salts of tetrazole, and salts of triazole, and an oxidizer selected from the group consisting of phase stabilized ammonium nitrate and ammonium perchlorate. The nonazide fuels may be further selected from the group consisting of 1-, 3-, and 5-substituted nonmetal salts of triazoles, and 1- and 5-substituted nonmetal salts of tetrazoles wherein the salts consist of nonmetallic cationic and anionic components, and, the salts are substituted with hydrogen or a nitrogen-containing compound.

A preferred gas generant composition results from the mixture of gas generant constituents including nitroguanidine, comprising 1%-30% by weight of the gas generant composition, one or more amine salts of tetrazoles and/or triazoles, comprising 4%-40% by weight of the gas generant composition, and PSAN, comprising 40%-85% by weight of the gas generant composition. In the percentages given, an even more preferred embodiment results from the mixture of gas generant constituents consisting essentially of NQ, PSAN, and amine salt(s) of 5,5'-bis-1H-tetrazole. In the percentages given, a most preferred composition results from the mixture of gas generant constituents consisting essentially of NQ, PSAN, and diammonium salt of 5,5'-bis-1H-tetrazole (BHT.2NH$_3$). When combined, the fuel component consisting of NQ and one or more high nitrogen fuels as described herein, comprises 15%-60% by weight of the gas generant composition.

Other nonmetal inorganic oxidizers such as ammonium perchlorate, or oxidizers that produce minimal solids when combined and combusted with the fuels listed above, may also be used. The ratio of oxidizer to fuel is preferably adjusted so that the amount of oxygen allowed in the equilibrium exhaust gases is less than 3% by weight, and more preferably less than or equal to 2% by weight. The oxidizer comprises 40%-85% by weight of the gas generant composition.

An optional burn rate modifier, from 0-10% by weight in the gas generant composition, is selected from a group including an alkali metal, an alkaline earth or a transition metal salt of tetrazoles or triazoles; an alkali metal or alkaline earth nitrate or nitrite; TAGN; dicyandiamide, and alkali and alkaline earth metal salts of dicyandiamide; alkali and alkaline earth borohydrides; or mixtures thereof. An optional combination slag former and coolant, in a range of 0 to 10% by weight, is selected from a group including clay, silica, glass, and alumina, or mixtures thereof. When combining the optional additives described, or others known to those skilled in the art, care should be taken to tailor the additions with respect to acceptable thermal stability, burn rates, and ballistic properties.

U.S. Pat. No. 5,872,329 discloses gas generants including 5-aminotetrazole nitrate (5-ATN) provided at 25-100% by weight of the gas generant, depending on the application. 5-ATN is characterized as an oxygen-rich fuel attributed to the oxygen in the nitrate group. The use of 5-ATN within a gas generant composition therefore requires little or no additional oxidizer, again depending on the application. 5-ATN is more preferably provided at 30-95% by weight and most preferably provided at 55-85% by weight of the gas generant composition.

In certain applications, the oxygen balance must be tailored to accommodate reduced levels of carbon monoxide (CO) and nitrogen oxides (NOx) as driven by original equipment manufacturer toxicity requirements. For example, the gas generated upon combustion of a gas generant within a vehicle occupant restraint system must minimize or eliminate production of these toxic gases. Therefore, when adding an oxidizer to 5-ATN, it is generally understood that an oxygen balance of about −4.0 to +4.0 is desirable when the gas generant is used in an airbag inflator. The preferred percentages of 5-ATN reflect this characteristic.

One or more oxidizers may be selected from the group including nonmetal, alkali metal, and alkaline earth metal nitrates, nitrites, perchlorates, chlorates, and chlorites for example. Other oxidizers well known in the art may also be used. These include alkali, alkaline earth, and transitional metal oxides, for example. Preferred oxidizers include phase stabilized ammonium nitrate (PSAN), ammonium nitrate, potassium nitrate, and strontium nitrate. The oxidizer(s) is provided at 5-70% by weight of the gas generant composition and more preferably at 20-45% by weight of the oxidizer.

Standard additives such as binders, slag formers, burn rate modifiers, and coolants may also be incorporated if desired. Inert components may be included and are selected from the group containing clay, silicon, silicates, diatomaceous earth, and oxides such as glass, silica, alumina, and titania. The silicates include but are not limited to silicates having layered structures such as talc and the aluminum silicates of clay and mica; aluminosilicate; borosilicates; and other silicates such as sodium silicate and potassium silicate. The inert component is present at about 0.1-20% by weight, more preferably at about 0.1-8%, and most preferably at 0.1-3%. A most preferred embodiment contains 73.12% 5-ATN and 26.88% PSAN10 (ammonium nitrate stabilized with 10% potassium nitrate).

Referring again to FIGS. 1 and 5, at least one orifice 54 is provided to enable fluid communication between inflation gas generant combustion chamber 50c and an interior of shell 24. Orifice 54 is also sized to act as a flow regulator to regulate a flow of combustion products from igniter 27 in shell 24 to inflation gas generant combustion chamber 50c, to correspondingly regulate the time period between activation of igniter 27 and initiation of combustion of inflation gas generant composition 52.

Figure 5:
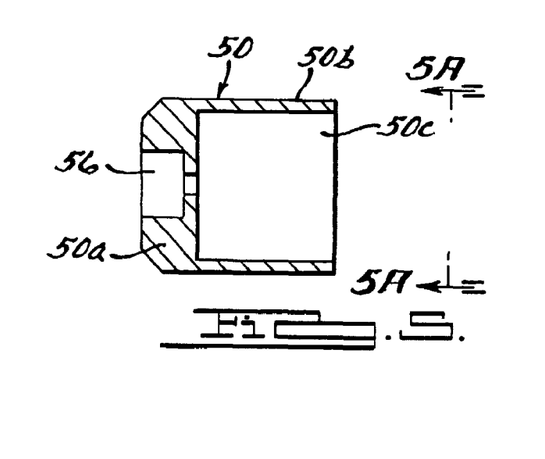
FIG. 5 is a cross-sectional side view of a gas generant enclosure in accordance with one embodiment of the present invention.
Figure 5A:
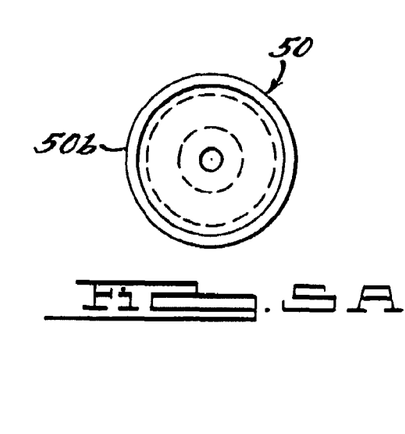
FIG. 5A is a schematic end view of the enclosure shown in FIG. 5.

Referring to FIGS. 1 and 5, in one embodiment orifice 54 is incorporated into a plate 55 positioned to cover an end portion of gas seal 40. A countersunk through hole 56 is then formed in enclosure base portion 50a (FIG. 5) and dimensioned to accommodate gas seal 40 therein when enclosure 50 is positioned to abut shell 24. Hole 56 enables fluid communication between orifice 54 in plate 55 and combustion chamber 50c. Orifice plate 55 may be stamped from steel or any other suitable metal or metal alloy.

Figure 5B:
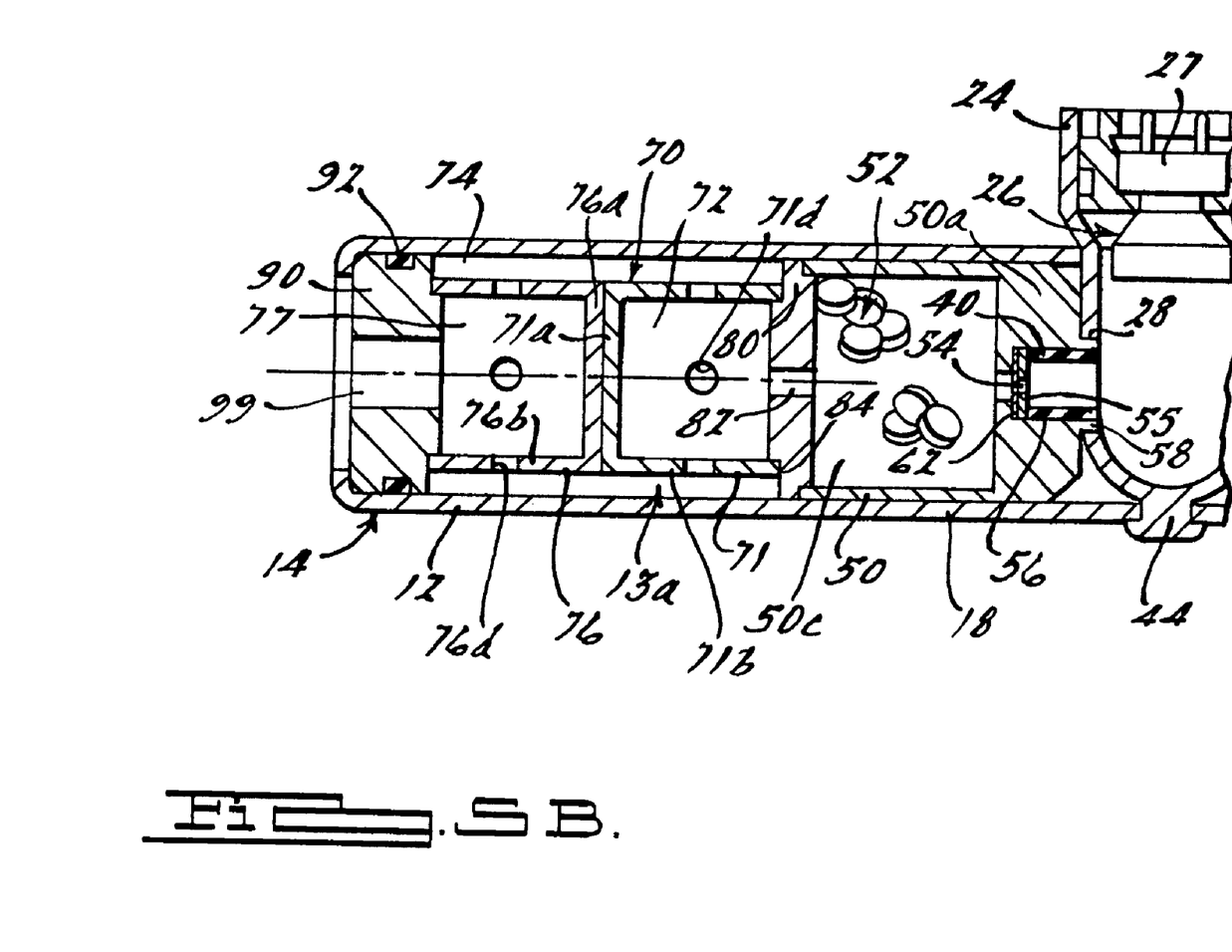
FIG. 5B is a schematic cross-sectional side view of an alternative embodiment of the gas generating system, showing a portion of a gas generant enclosure received in and retained in an orifice formed in an igniter assembly shell.

Referring to FIG. 5B, in an alternative embodiment, a projection 58 is formed along a base portion 50a of enclosure 50. Projection 58 and shell orifice 28 are sized such that an interference fit is formed when projection 58 is inserted into orifice 28, thereby securing enclosure 50 to shell 24 and forming a gas-tight seal between the shell and enclosure 50. In this embodiment, fluid flow orifice 54 extends through projection 58, enabling fluid communication between the interior of shell 24 and combustion chamber 50c.

When referring to gas generator components in gas generator chamber 13b similar to those positioned in chamber 13a, similar element numbers will be used. Referring to FIG. 1, on an opposite side of igniter assembly 22 from enclosure 50 previously described, an enclosure 50' is provided in chamber 13b for housing an inflation gas generant composition 52' that is ignitable upon fluid communication with igniter combustion products. Enclosure 50' preferably includes a substantially circular base portion 50a' and at least one substantially cylindrical wall 50b' extending from base portion 50a'. Base portion 50a' and wall 50b' combine to define a combustion chamber 50c' housing inflation gas generant composition 52'. As seen in FIG. 1, enclosure 50' may be slidingly inserted into housing 12 and positioned to abut shell 24. Enclosure 50' may be stamped, drawn, cast and finish machined or otherwise formed from steel or another suitable metal or metal alloy. Gas generant composition 52' positioned in enclosure 50' may be any of the known gas generant compositions previously described in connection with enclosure 50.

Referring again to FIG. 1, an orifice 54' is provided to enable fluid communication between inflation gas generant combustion chamber 50c' and an interior of shell 24. Orifice 54' is also sized to act as a flow regulator to regulate a flow of combustion products from igniter 27 in shell 24 to inflation gas generant combustion chamber 50c', to correspondingly regulate the time period between activation of igniter 27 and initiation of combustion of inflation gas generant composition 52'. In the embodiment shown in FIG. 1, orifice 54' is incorporated into an orifice plate 55' similar to plate 55 previously described.

In a particular embodiment, orifice 54 is adapted to regulate the flow of combustion products from igniter assembly 22 to the inflation gas generant composition 52, and orifice 54' is adapted to regulate the flow of combustion products from igniter assembly 22 to the inflation gas generant composition 52', such that the time period between activation of the igniter and initiation of combustion of inflation gas generant composition 52 is different from the time period between activation of the igniter and initiation of combustion of inflation gas generant composition 52'. Thus, appropriate sizing of flow orifices 54 and 54' provide a degree of individual programmability to each of gas generator chambers 13a and 13b, enabling a different deployment time to be provided for each end of the gas generator.

Referring again to FIGS. 1 and 4, a frangible seal 62 (for example, a burst disk or a tape seal) may be provided for sealing orifice 54 prior to activation of the gas generator. As seen in FIGS. 1 and 4, seal 62 may be positioned along plate 55 to cover orifice 54, or the seal may be applied to a suitable surface of enclosure base portion 50 to cover orifice 54.

Similarly, a frangible seal 62' is provided for sealing orifice 54' prior to activation of the gas generator. As seen in FIGS. 1 and 4, seal 62' may be positioned along plate 55' to cover orifice 54', or the seal may be applied to a suitable surface of enclosure base portion 50 to cover orifice 54. Seals 62 and 62' are designed to be rupturable by heat and/or pressure from combustion products resulting from activation of igniter 27. Seals 62 and 62' may be stamped or formed from any of a variety of gas or fluid impermeable materials, as is known in the art. Exemplary materials include aluminum, steel, tin and nonmetal seals. Alternatively, a seal tape formed from the same or similar materials may be used. The materials and structure of the seal will depend on the desired performance characteristics of the gas generator. For example, seals made from materials and/or having structures which are relatively more or less readily ruptured may be used.

Figure 6:
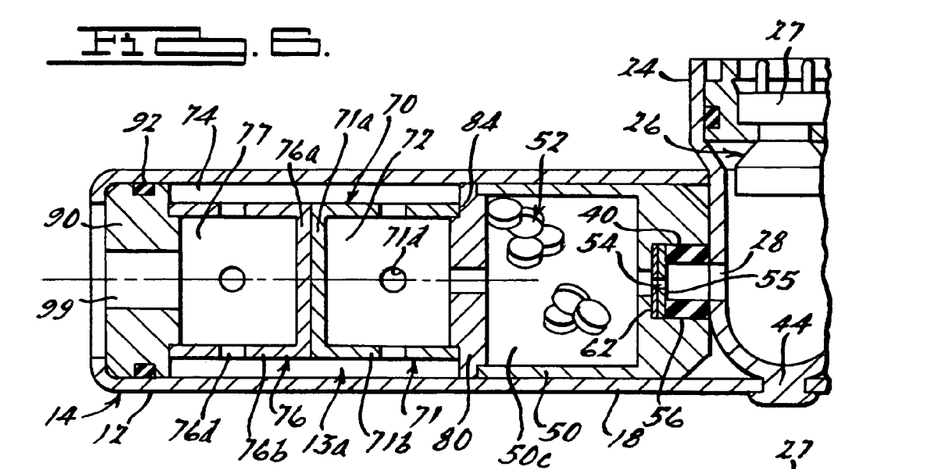
FIG. 6 is a cross-sectional side view of a portion of the gas generator shown in FIG. 1.

Referring to FIGS. 1 and 6, a modular baffle system, generally designated 70, is provided for cooling and removing slag from combustion products generated by inflation gas generant composition 52 in combustion chamber 50c. As used here, the term "baffle" refers to a device that regulates the flow of a fluid. Referring to FIGS. 1 and 6, in one embodiment baffle system 70 comprises a first baffle member 71 and a second baffle member 76. Baffle members 71 and 76 are sized so as to be spaced apart from housing wall 18 when the baffle members are positioned within housing 12.

Referring to FIGS. 1 and 6, in one embodiment first baffle member 71 preferably includes a substantially circular base portion 71a and a substantially cylindrical wall 71b extending from base portion 71a. Base portion 71a and wall 71b combine to define a first baffle chamber 72 for receiving therein combustion products from combustion of inflation gas generant 52 in combustion chamber 50c. At least one (and preferably a plurality) of orifices 71d is formed in wall 71b for enabling flow of combustion products received from combustion chamber 50c into outer baffle chamber 74 (described below). In the embodiment shown in FIGS. 1 and 6, several orifices 71d are spaced apart approximately 90° along a periphery of wall 71b.

Second baffle member 76 preferably includes a substantially circular base portion 76a and a substantially cylindrical wall 76b extending from base portion 76a. Base portion 76a and wall 76b combine to define a second baffle chamber 77 positioned radially inwardly of an outer baffle chamber 74 (described below.) At least one (and preferably a plurality) of orifices 76d is formed in wall 76b for receiving into second baffle chamber 77 combustion products from outer baffle chamber 74.

Referring again to FIG. 6, housing wall 18, in combination with an outer surface of first baffle member 71, defines an outer baffle chamber 74 positioned radially outwardly from first baffle chamber 72 and second baffle chamber 77 for receiving therein combustion products from the first baffle chamber. Outer baffle chamber 74 preferably forms an annular plenum or flow passage surrounding first and second baffle members 71, 76.

In the embodiment shown in FIGS. 1 and 6, first baffle member base portion 71a is spaced apart from enclosure 50, and second baffle member base portion 76a is positioned adjacent first baffle member base portion 71a. Abutment of base portions 71a and 76a of baffle members 71 and 76 prevents direct fluid communication between first baffle chamber 72 and second baffle chamber 77.

An orifice plate 80 engages an edge portion of wall 50b of enclosure 50 to provide a gas-tight seal for combustion chamber 50c. An orifice 82 is formed in plate 80 to enable fluid communication between combustion chamber 50c and first baffle chamber 72. If desired, orifice 82 may also be sized to regulate, in a desired manner, a flow of combustion products from the inflation gas generant combustion chamber into the first baffle chamber.

First baffle member 71 may be inserted into an end of housing 12 and positioned to abut orifice plate 80. A shoulder 84 is preferably formed along a surface of plate 80 for aligning an edge portion of first baffle member wall 71b therealong as the first baffle member wall 71b is positioned to abut the surface of orifice plate 80.

Figure 7:
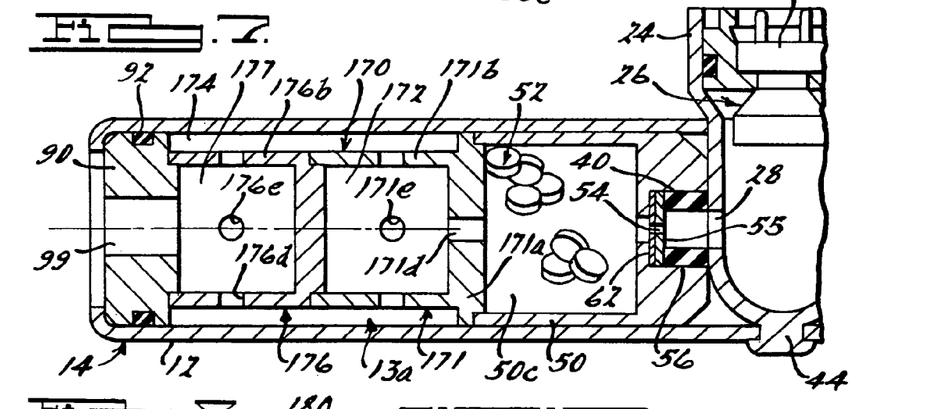
FIG. 7 is a cross-sectional side view of a portion of the gas generator shown in FIG. 4.

In FIGS. 4 and 7, when referring to baffle system elements similar to those described with reference to FIGS. 1 and 7, similar numbers will be used. Referring to FIGS. 4 and 7, in alternative embodiment, a first baffle member 171 preferably includes a substantially circular base portion 171a, an orifice 171d formed in base portion 171a, and at least one substantially cylindrical wall 171b extending from base portion 171a. Base portion 171a and wall 171b combine to define a first third baffle chamber 172 for receiving therein (via orifice 171d) combustion products from combustion of inflation gas generant positioned 52 in combustion chamber 50c. At least one (and preferably a plurality) of orifices 171e are formed in wall 171b for enabling flow of combustion products received from combustion chamber 50c into outer baffle chamber 174.

Second baffle member 176 preferably includes a substantially circular base portion 176a and a substantially cylindrical wall 176b extending from base portion 176a. Base portion 176a and wall 176b combine to define a second baffle chamber 177 positioned radially inwardly of outer baffle chamber 174. At least one (and preferably a plurality) of orifices 176d is formed in wall 176b for receiving into baffle chamber 177 combustion products from outer baffle chamber 174.

An annular shoulder 175 is preferably formed along second baffle member base portion 176a for aligning an edge of first baffle member wall 171b therealong as second baffle member base portion 171a is positioned to abut the edge of first baffle member wall 171b.

All of the baffle members described above may be stamped, drawn, cast and finish machined, or otherwise formed from steel or another suitable metal or metal alloy. Also, in the embodiments shown in FIGS. 1 and 6, second baffle chamber 77 of second baffle member 76 opens toward an end of housing 12. An endcap 90 is positioned abutting an edge of second baffle member wall 76b to provide a gas-tight seal between the second baffle member and endcap 90. Endcap 90 is crimped or otherwise fixed to the end of the housing to provide a closure for housing 12. An O-ring 92 or other compressive seal may be provided along surfaces of endcap 90 residing opposite housing wall 18, for providing a gas tight seal to prevent migration of inflation gases through the ends of the gas generator. Endcap 90 may be cast, stamped, extruded, or otherwise metal-formed. Alternatively, endcap 90 may be molded from a suitable polymer.

Figure 9:
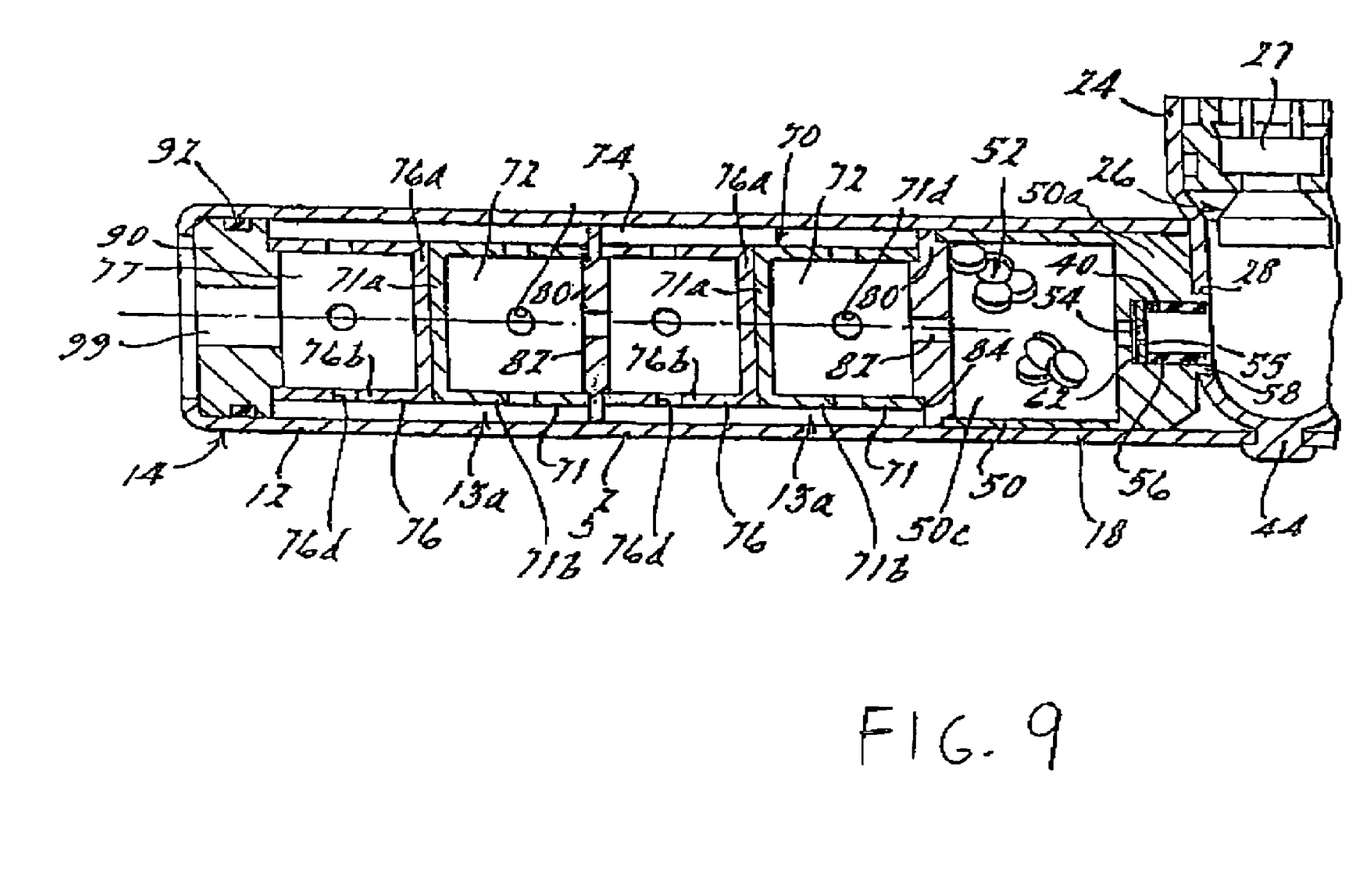
FIG. 9 is a schematic cross-sectional side view of a portion of an alternative embodiment of the gas generator, showing two stacked pairs of baffle elements.

Referring to FIGS. 1, 4, 6, 7, and 9, the baffle system described herein is modular in that pairs of baffle elements 71 and 76 as shown in FIGS. 1, 6, and 9 (or 171 and 176 as shown in FIGS. 4 and 7) may be stacked along a length of either of gas generator chambers 13a and 13b, to tailor the length of the flow path of gases through the baffle system in order to provide varying degrees of cooling of the inflation gases, as desired. FIG. 9 illustrates this principle by showing one additional pair of baffle elements 71 and 76 stacked adjacent another pair of baffle elements 71 and 76, to tailor the degree of inflation gas cooling as described.

Operation of the gas generator will now be discussed. Referring to FIGS. 1 and 6, upon receipt of a signal from a crash sensor, an electrical activation signal is sent to igniter 27. Combustion products from the igniter expand into shell 24, proceeding out of shell 24 through shell orifices 28 and 36 and through flow regulator orifices 54 and 54'. The time required for initiation of combustion of the gas generants in combustion chambers 50c and 50c' is believed to be dependent on the sizes of orifices 54 and 54'. For example, it is believed that where flow regulator orifices 54 and 54' are relatively smaller in size, propagation of igniter combustion products from shell 24 to combustion chambers 50c and 50c' will be delayed, thereby correspondingly delaying the onset of inflation gas generant combustion. Products form combustion of gas generants 52 and 52' proceed through plate orifices 82 and 82' into respective first baffle chambers 72 and 72', then into outer baffle chambers 74 and 74', and then into second baffle chambers 77 and 77'. From there, the gases exit through apertures 99 formed in endcaps 90 to inflate an associated airbag (not shown).

Figure 8:
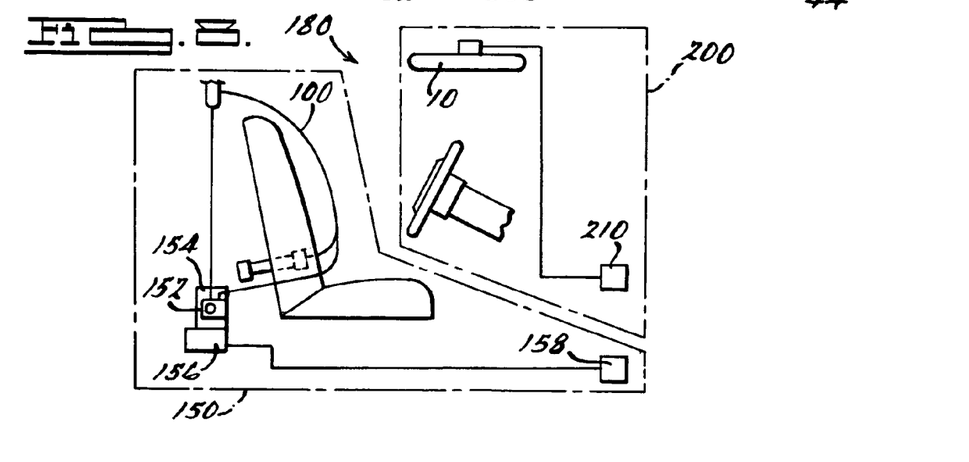
FIG. 8 is a schematic view of an airbag system and a vehicle occupant restraint system incorporating a gas generator in accordance with the present invention.

Operation of the embodiment shown in FIGS. 4 and 8 is substantially identical to that described for the embodiment shown in FIGS. 1 and 6.

The gas generator described herein provides several advantages over known designs. Each of gas generator chambers 13a and 13b is independently programmable with regard to such factors as the time period between activation of the igniter and initiation of gas generant combustion; the amount and type of gas generant positioned in each gas generator chamber; and the degree of cooling achievable by the modular baffle system. In addition, the use of interference fits and other securement means obviate the need for welds in assembly of the gas generator. By controlling the orifice positioned between the micro-gas generator and the gas generant, the time period between activation of the igniter and initiation of combustion of the inflation gas generant composition may be correspondingly controlled.

Referring to FIG. 8, any embodiment of the gas generator described herein may be incorporated into an airbag system 200. Airbag system 200 includes at least one airbag (not shown) and a gas generator 10 as described herein coupled to the airbag so as to enable fluid communication with an interior of the airbag. Airbag system 200 may also be in communication with a known crash event sensor 210 that is in operative communication with a known crash sensor algorithm which signals actuation of airbag system 200 via, for example, activation of igniter 27 (not shown in FIG. 8) in the event of a collision.

Referring again to FIG. 8, an embodiment of the gas generator or an airbag system including an embodiment of the gas generator may be incorporated into a broader, more comprehensive vehicle occupant restraint system 180 including additional elements such as a safety belt assembly. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a known crash event sensor 158 (for example, an inertia sensor or an accelerometer) that is in operative communication with a known crash sensor algorithm which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the baffles and various enclosures may be molded, stamped or otherwise metal-formed from carbon steel, aluminum, metallic alloys, or polymeric equivalents. Also, additional gas generator chambers similar to chambers 13*a* and 13*b* may be formed extending outward from igniter assembly 22 to provide additional independently programmable inflation gas sources as part of a single gas generator.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

I claim:

1. A gas generating system comprising:
a baffle system including
a first baffle chamber in fluid communication with a separate inflation gas generant combustion chamber for receiving therein combustion products from combustion of an inflation gas generant positioned in the combustion chamber; and
an outer baffle chamber positioned radially outwardly from the first baffle chamber for receiving therein combustion products from the first baffle chamber, and
a second baffle chamber positioned radially inwardly of the outer baffle chanter for receiving therein combustion products from the outer baffle chamber.

2. The gas generating system of claim 1 further comprising an enclosure defining the inflation gas generant combustion chamber, and
at least one orifice formed in the enclosure for regulating a flow of combustion products from the inflation gas generant combustion chamber into the first baffle chamber.

3. A gas generating system comprising:
a modular baffle assembly including:
an enclosure; and
a plurality of discrete baffle elements positioned within the enclosure, each baffle element of the plurality of baffle elements being spaced apart from a wall of the enclosure to define a flow passage for an inflation fluid between each baffle element of the plurality of baffle elements and the wall, a first baffle element of the plurality of baffle elements defining a first baffle chamber, the first baffle chamber being in fluid communication with the flow passage, a second baffle element of the plurality of baffle elements defining a second baffle chamber, the second baffle chamber being in fluid communication with the flow passage, at least one of the first and second baffle chambers being positioned so as to enable fluid communication with an enclosure containing an inflation gas generant composition upon activation of the gas generating system.

4. The gas generating system of claim 3 wherein the first baffle element is positioned adjacent the second baffle element.

5. The gas generating system of claim 3 further comprising a barrier for substantially preventing direct fluid communication between the first baffle chamber and the second baffle chamber.

6. The gas generating system of claim 3 wherein the first baffle element is adapted for channeling flow of an inflation fluid from the first baffle chamber into the flow passage, and the flow passage is adapted for channeling flow of the inflation fluid from the first baffle chamber into the second baffle chamber.

7. The gas generating system of claim 6 wherein the second baffle element is adapted for channeling flow of the inflation fluid from the second baffle chamber to an exterior of the gas generating system.

8. The gas generating system at claim 6 wherein a third baffle element of the plurality of baffle elements defines a third baffle chamber, the third baffle chamber being in fluid communication with the second baffle chamber, and wherein the second baffle element is adapted for channeling flow of an inflation fluid from the second baffle chamber into the third baffle chamber.

9. The gas generating system of claim 8 wherein a fourth baffle element of the plurality of baffle elements defines a fourth baffle chamber, the fourth baffle chamber being in fluid communication with the flow passage, the third baffle chamber being in fluid communication with the flow passage, the flow passage being adapted for channeling flow of an inflation fluid from the third baffle chamber into the fourth baffle chamber.

10. The gas generating system of claim 3 wherein at least one of the first baffle element and the second baffle element includes a base portion and a wall extending from the base portion, the base portion and the wall defining a respective baffle chamber.

11. A gas generating system comprising a gas generator including:
a first enclosure;
a second enclosure;
a projection formed on one of the first enclosure and the second enclosure; and
an aperture formed in the other one of the first enclosure and the second enclosure
for receiving the projection therein, at least a portion of the projection being fixed within the aperture to prevent withdrawal of the projection from the aperture, thereby securing together the first enclosure and the second enclosure, the first enclosure comprising an igniter assembly and the second enclosure defining a combustion chamber for an inflation gas generating composition, the second enclosure being positioned so as to enable fluid communication with the first enclosure upon activation of the gas generator, and wherein the projection is formed on the second enclosure and an orifice is formed in the second enclosure extending through the projection to regulate the flow of a fluid between the first enclosure and the second enclosure.

12. A gas generating system comprising a gas generator including:
- a first enclosure;
- a second enclosure:
- a projection formed on one of the first enclosure and the second enclosure; and
- an aperture formed in the other one of the first enclosure and the second enclosure for receiving the projection therein, at least a portion of the projection being fixed within the aperture to prevent withdrawal of the projection from the aperture, thereby securing together the first enclosure and the second enclosure; and
- wherein the aperture end at least a portion of the projection are dimensioned such that an interference fit is formed between the projection and the aperture when the projection is received within the aperture, to prevent withdrawal of the projection from the aperture.

* * * * *

UNITED STATES PATENT AND TRADEMARK OFFICE
CERTIFICATE OF CORRECTION

PATENT NO. : 7,367,584 B2 Page 1 of 1
APPLICATION NO. : 11/108559
DATED : May 6, 2008
INVENTOR(S) : Blackburn It is certified that error appears in the above-identified patent and that said Letters Patent is hereby corrected as shown below:

Column 2; Line 27; please delete "sideview" and insert --side view--

Column 2; Line 33; please delete "of"

Column 10; Line 44; please delete "inclusing" and insert --including--

Column 10; Line 63; please delete "5,5oc-" and insert --5,5'- --

Column 15; Line 27; please delete "first"

Column 15; Line 37; please delete "second" and insert --fourth--

Column 17; Claim 1; Line 47; please delete "chanter" and insert --chamber--

Signed and Sealed this

Twenty-sixth Day of August, 2008

JON W. DUDAS
*Director of the United States Patent and Trademark Office*